(12) United States Patent
Lee et al.

(10) Patent No.: US 8,439,325 B2
(45) Date of Patent: May 14, 2013

(54) CLAMP STRUCTURE

(75) Inventors: Ming-Chan Lee, Hsinchu (TW);
Lan-Chun Yang, Hsinchu (TW);
Hung-Yuan Lin, Hsinchu (TW); San-Yi Kuo, Hsinchu (TW); Wei-Te Chien, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 0 days.

(21) Appl. No.: 13/082,417

(22) Filed: Apr. 8, 2011

(65) Prior Publication Data
US 2012/0211627 A1 Aug. 23, 2012

(30) Foreign Application Priority Data
Feb. 23, 2011 (TW) .............................. 100105968 A

(51) Int. Cl.
*A01K 97/10* (2006.01)
(52) U.S. Cl.
USPC .................... 248/541; 248/218.1; 248/230.1; 343/878; 343/882
(58) Field of Classification Search .... 248/230.1–230.5, 248/231.41, 231.51, 74.1, 74.3, 218.4, 219.3, 248/219.4, 220.22; 343/878, 882, 890, 892; D14/238
See application file for complete search history.

(56) References Cited

U.S. PATENT DOCUMENTS

| | | | |
|---|---|---|---|
| 3,944,279 A * | 3/1976 | Blackstock et al. .......... 182/187 |
| 5,941,497 A * | 8/1999 | Inoue et al. ................... 248/514 |
| 5,969,692 A * | 10/1999 | Ishizuka ........................ 343/840 |
| 6,512,492 B2 * | 1/2003 | Overton ........................ 343/891 |
| 7,408,526 B2 * | 8/2008 | Pan ................................ 343/880 |
| 7,866,616 B2 * | 1/2011 | Wen et al. .................. 248/219.4 |
| 2005/0057428 A1 * | 3/2005 | Fujita ............................ 343/882 |
| 2009/0061761 A1 * | 3/2009 | Yang et al. .................... 455/3.02 |
| 2009/0179115 A1 * | 7/2009 | Shen ................................ 248/65 |
| 2010/0177010 A1 * | 7/2010 | Michaelis ..................... 343/882 |

\* cited by examiner

*Primary Examiner* — Gwendolyn Baxter
(74) *Attorney, Agent, or Firm* — Winston Hsu; Scott Margo

(57) ABSTRACT

A clamp structure includes a clamping component for clamping a tube, and at least one bridging component disposed on a lateral surface of the clamping component. A pivoting portion is disposed on the bridging component, and the bridging component pivots with an antenna module via the pivoting portion, so that the antenna module can pivot relative to the clamping component along a radial plane of the clamping component.

7 Claims, 3 Drawing Sheets

CLAMP STRUCTURE

BACKGROUND OF THE INVENTION

1. Field of the Invention

The present invention relates to a clamp structure, and more particularly, to a clamp structure for bridging a platform.

2. Description of the Prior Art

For installing an antenna module on a tube, a conventional assembly is disposing the antenna module on a clamp structure, and locking the clamp structure on the tube. A conventional clamp structure includes an annular clamping component for clamping the annular tube, and a bridging component disposed on the annular clamping component. The antenna module is installed on the bridging component of the clamp structure. The conventional clamp structure connects the bridging component to the lateral surface of the annular clamping component as a planar direction of the bridging component is parallel to an axial direction of the annular clamping component. Therefore, the antenna module can pivot relative to the annular clamping component along a direction perpendicular to the radial direction of the annular clamping component, so pivot freedom of the antenna module relative to the tube is constrained. In addition, the other conventional clamp structure disposes the bridging component on top of the annular clamping component for increasing pivot freedom of the antenna module relative to the tube. However, this conventional clamp structure has drawbacks of huge volume and expensive cost.

SUMMARY OF THE INVENTION

The present invention provides a clamp structure for bridging a platform for solving above drawbacks.

According to the claimed invention, a clamp structure includes a clamping component for clamping a tube, and at least one bridging component disposed on a lateral surface of the clamping component. A pivoting portion is formed on the bridging component, and the bridging component pivots to an antenna module via the pivoting portion, so that the antenna module pivots relative to the clamping component along a radial plane of the clamping component. An aim of the adjusting mechanism is that the antenna module can pivot relative to the supporting tube via the clamp within great range, and can further pivot along the pivot hole on the bridging component within tiny range after the clamp is fixed on the supporting tube by a fixing component set.

According to the claimed invention, the clamp structure further includes a supporting component disposed on the lateral surface of the clamping component and contacting against the bridging component for preventing the bridging component from bending relative to the clamping component.

According to the claimed invention, the clamp structure further includes two planks respectively connecting to two edges of the clamping component, and a fixing component set passing through the two planks for closing the two planks so as to increase clamping force of the clamping component applied on the tube.

According to the claimed invention, a planar direction of the bridging component is substantially perpendicular to an axial direction of the clamping component.

According to the claimed invention, the pivoting portion is a pivot hole.

According to the claimed invention, the pivoting portion is an engaging protrusion or an engaging sunken part.

According to the claimed invention, the bridging component is welded on or stretches from the lateral surface of the clamping component.

According to the claimed invention, the tube is a circular tube, and the clamping component is a circular structure.

The clamp structure of the present invention connects the bridging component to the lateral surface of the clamping component horizontally, which means the planar direction of the bridging component is substantially perpendicular to the axial direction of the clamping component. The antenna module can pivot relative to the clamping component along the radial plane of the clamping component via the pivoting portion of the bridging component, so that the antenna module can pivot relative to the tube along the radial plane of the tube.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
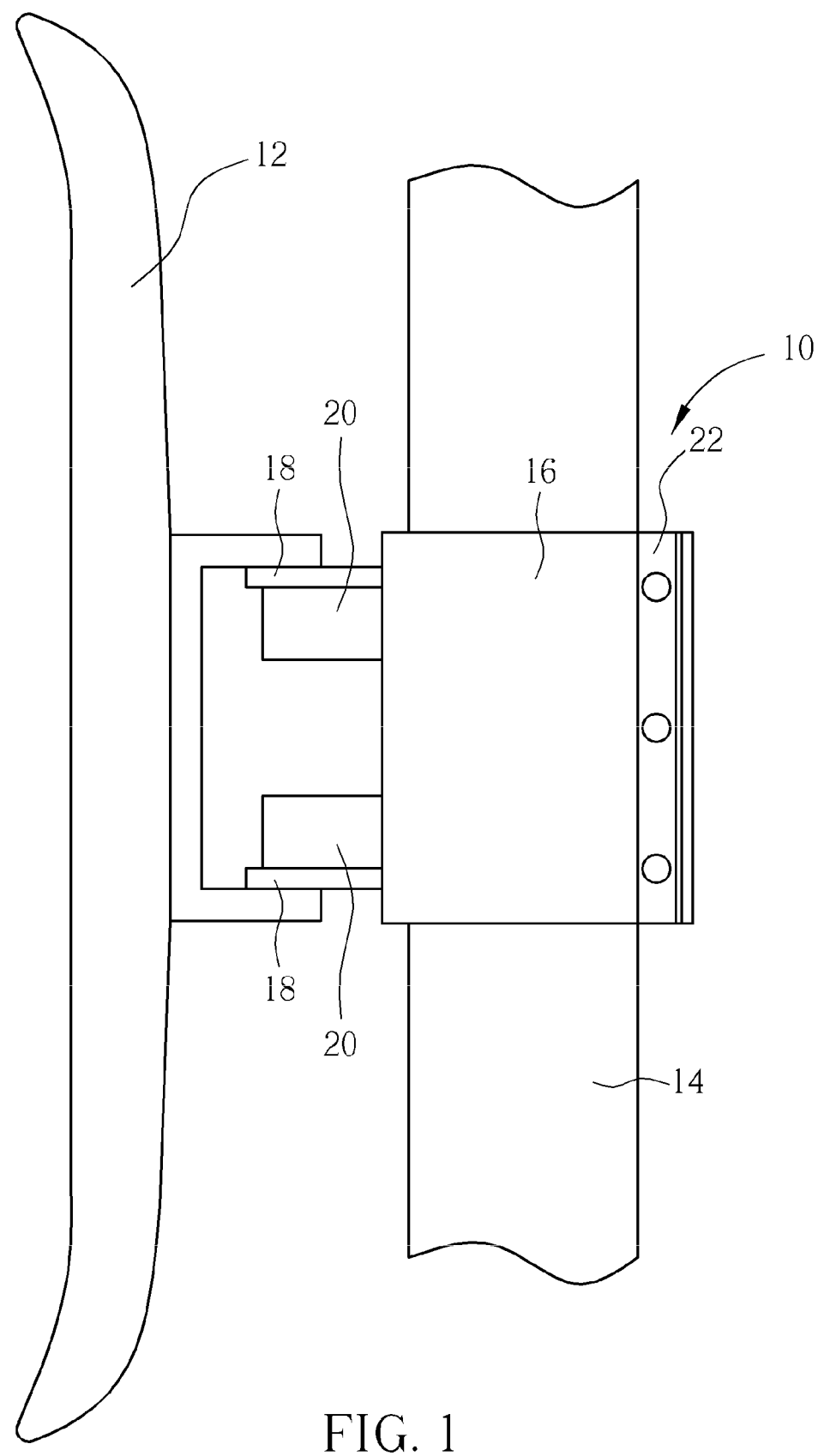
FIG. 1 is a diagram of a clamp structure and corresponding components according to an embodiment of the present invention.

Please refer to FIG. 1. FIG. 1 is a diagram of a clamp structure 10 and corresponding components according to an embodiment of the present invention. The clamp structure 10 can pivot to an antenna module 12 and sheathe on a tube 14, so that an angle between the antenna module 12 and the tube 14 can be adjusted via the clamp structure 10.

Figure 2:
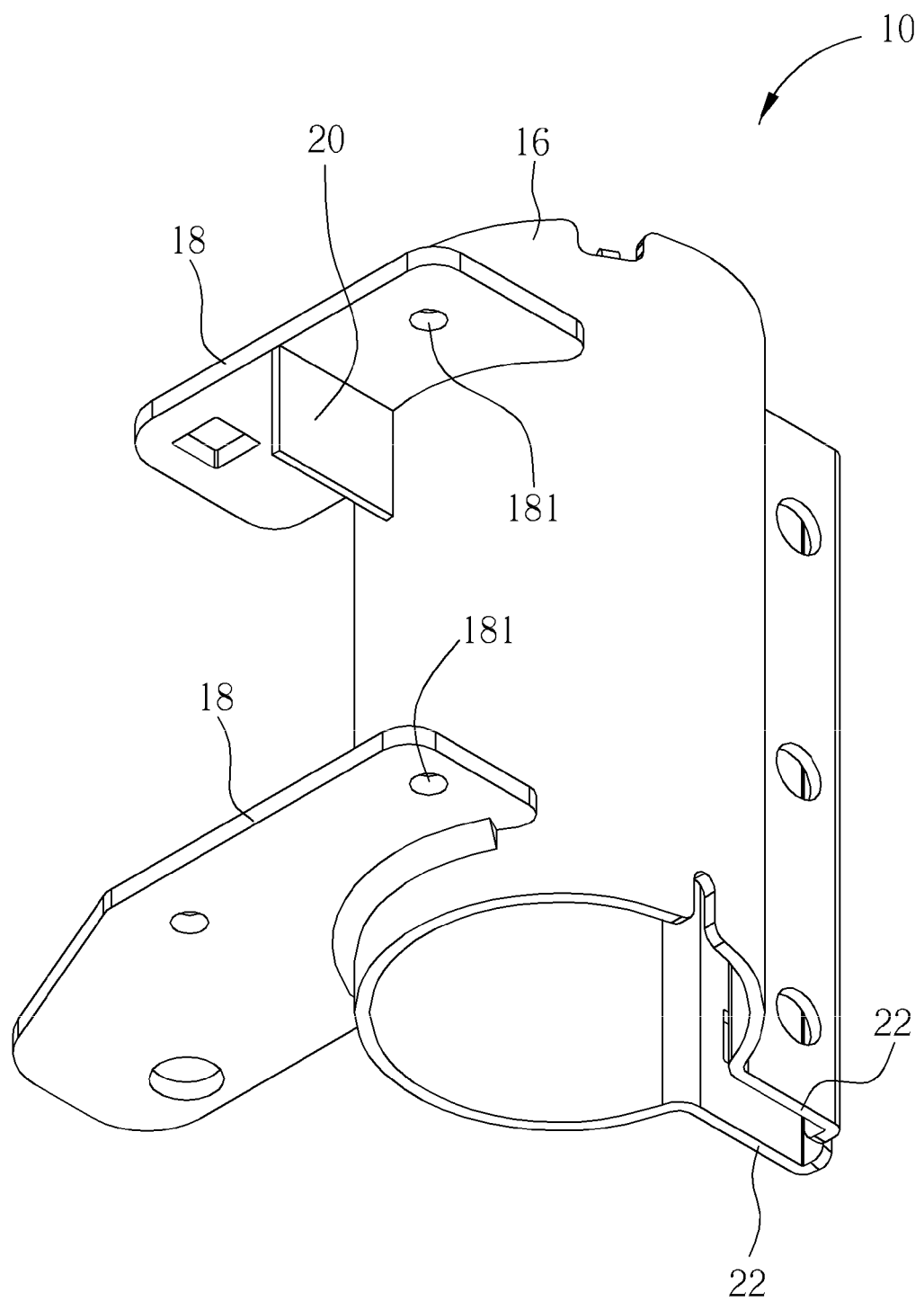
FIG. 2 and FIG. 3 are diagrams of the clamp structure in different view angles according to the embodiment of the present invention.
Figure 3:
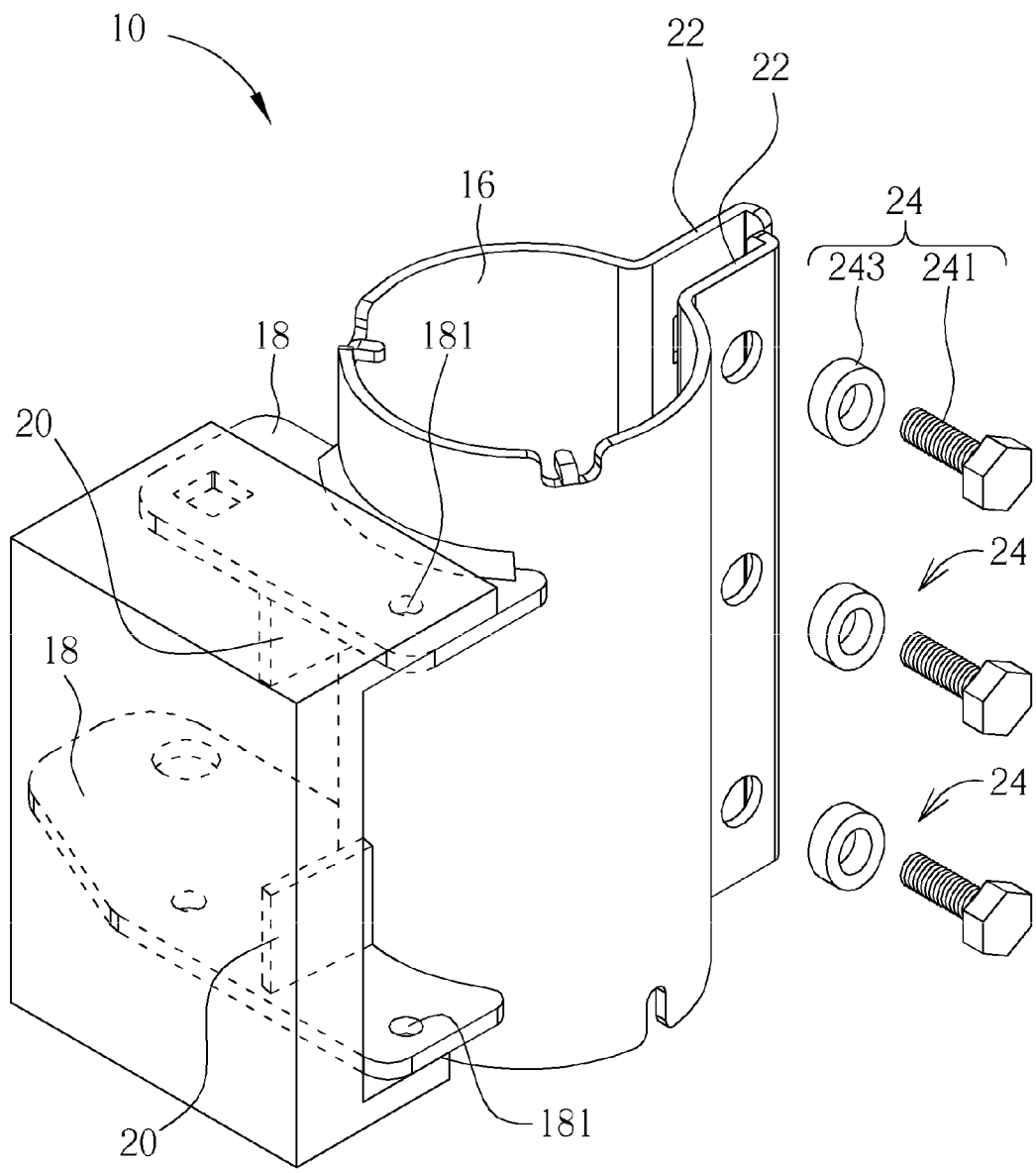

Please refer to FIG. 2 and FIG. 3. FIG. 2 and FIG. 3 are diagrams of the clamp structure 10 in different view angles according to the embodiment of the present invention. The clamp structure 10 includes a clamping component 16 for clamping the tube 14. The tube 14 can be an annular tube, and the clamping component 16 can be an annular structure correspondingly. The clamp structure 10 further includes at least one bridging component 18 connected to a lateral surface of the clamping component 16 by mechanical treatment, such as a soldering manner or an integrally-formed manner. The bridging component 18 can further stretch from the lateral surface of the clamping component 16. A pivoting portion 181 is formed on the bridging component 18, and the bridging component 18 pivots to the antenna module 12 via the pivoting portion 181. A planar direction of the bridging component 18 can substantially be perpendicular to an axial direction of the clamping component 16, so that the antenna module 12 can pivot relative to the clamping component 16 along a radial plane of the clamping component 16 via the pivoting portion 181 of the bridging component 18. In addition, the clamp structure 10 can further include a supporting component 20 disposed on the lateral surface of the clamping component 16 and contacting against the bridging component 18 for supporting the bridging component 18, so as to prevent the bridging component 18 from bending relative to the lateral surface of the clamping component 16 due to overweight of the antenna module 12. The supporting component 20 can connect to the clamping component 16 and the bridging component 18 by a mechanical treatment, such as soldering. For example, the supporting component 20 can be integrated with the clamping component 16 monolithically.

For pivoting the antenna module 12 relative to the bridging component 18 stably, the pivoting portion 181 of the bridging component 18 can be a pivot hole, so that the antenna module 12 can pivot relative to the clamp structure 10 and the tube 14 by passing an external pivoting component through the pivot hole on the bridging component 18. In addition, the pivoting portion 181 of the bridging component 18 can be an engaging protrusion or an engaging sunken part, and the antenna module 12 can includes corresponding sunken parts or protrusions, so that the antenna module 12 can be easily assembled on or disassembled from the bridging component 18 of the clamp structure 10 by wedging the protrusions and the sunken parts in a tight fit manner, and the antenna module 12 can pivot relative to the clamp structure 10 and the tube 14 via the protrusions and the sunken parts. Structures of the pivoting portion 181 are not limited to the above-mentioned embodiment, and it depends on design demand.

It should be mentioned that the clamp structure 10 can include a plurality of bridging components 18 and a plurality of supporting components 20 for strengthening structural strength of the clamp structure 10 applied on the antenna module 12. As shown in FIG. 2 and FIG. 3, the clamp structure 10 can include two bridging components 18 and two supporting components 20. The two bridging components 18 can be respectively disposed on an upper area and a low area on the lateral surface of the corresponding clamping component 16. Accordingly, the supporting component 20 can be connected to the upper lateral surface or the low lateral surface of the clamping component 16, so as to support the corresponding bridging component 18 for preventing the bridging component 18 from bending. Amounts and disposal of the bridging component 18 and the supporting component 20 are not limited to the above-mentioned embodiment, and it depends on design demand.

Furthermore, as shown in FIG. 2 and FIG. 3, the clamp structure 10 can further include two planks 22 respectively connected to two edges of the clamping component 16, and a fixing component set 24 passing through the two planks 22 for closing the two planks 22, so as to increase clamping strength of the clamping component 16 applied on the tube 14. Generally, the fixing component set 24 can include a screw 241 and a nut 243. The screw 241 and the nut 243 are respectively disposed on two opposite surfaces of the two planks 22, and the nut 243 locks on the screw 241 passing through the plank 22, so as to close the two planks 22 by pressing. For increasing the clamping strength of the clamping component 16 applied on the tube 14, the clamp structure 10 can include a plurality of fixing component sets 24. An amount and disposal of the fixing component set 24 are not limited to the above-mentioned embodiment. In this embodiment, the clamp structure 10 includes three fixing component sets 24 respectively passing through an upper area, a middle area and a low area on the plank 22.

Comparing to the prior art, the clamp structure of the present invention connects the bridging component to the lateral surface of the clamping component horizontally, which means the planar direction of the bridging component is substantially perpendicular to the axial direction of the clamping component. The antenna module can pivot relative to the clamping component along the radial plane of the clamping component via the pivoting portion of the bridging component, so that the antenna module can pivot relative to the tube along the radial plane of the tube.

Those skilled in the art will readily observe that numerous modifications and alterations of the device and method may be made while retaining the teachings of the invention.

What is claimed is:

1. A clamp structure comprising:
a clamping component for clamping a tube; and
two bridging components respectively connected to an upper area and a low area on a lateral surface of the clamping component and arranged along a longitudinal direction of the clamping component, two pivoting portions being respectively formed on the bridging components, and the two bridging components respectively pivoting to an antenna module via the two pivoting portions, so that the antenna module pivots relative to the clamping component along a radial plane of the clamping component, wherein the longitudinal direction is substantially perpendicular to the radial plane of the clamping component.

2. The clamp structure of claim 1, further comprising:
at least one supporting component disposed on the lateral surface of the clamping component and contacting against at least one of the two bridging components for preventing the at least one of the two bridging components from bending relative to the clamping component.

3. The clamp structure of claim 1, further comprising:
two planks respectively connecting to two edges of the clamping component; and
a fixing component set passing through the two planks for closing the two planks so as to increase clamping force of the clamping component applied on the tube.

4. The clamp structure of claim 1, wherein a planar direction of each bridging component is substantially perpendicular to an axial direction of the clamping component.

5. The clamp structure of claim 1, wherein each pivoting portion is a pivot hole.

6. The clamp structure of claim 1, wherein each bridging component is welded on the lateral surface of the clamping component.

7. The clamp structure of claim 1, wherein the tube is a circular tube, and the clamping component is a circular structure.

* * * * *